3,830,886
PHOSPHORUS COMPOUNDS CONTAINING STABLE HALOGEN
Ralph A. Davis, Midland, and Ronald G. Tigner, North Bradley, Mich., assignors to The Dow Chemical Company, Midland, Mich.
No Drawing. Continuation-in-part of abandoned application Ser. No. 736,557, June 13, 1968. This application Feb. 8, 1971, Ser. No. 113,046
Int. Cl. C07f 9/08, 9/38; C09k 3/28
U.S. Cl. 260—953
9 Claims

ABSTRACT OF THE DISCLOSURE

New compounds have the formula:

$$\begin{array}{c} R-O \\ \phantom{R-}\diagdown \\ R'-O \end{array} \!\!\! \overset{O}{\underset{}{\parallel}}\!\! P-(O)_n-CH_2-\underset{\underset{CH_2R''}{|}}{\overset{\overset{CH_2R''}{|}}{C}}-CH_2R''$$

wherein $n$ is zero or one; R is lower alkyl, phenyl or alkylated phenyl having one to three lower alkyl substitutents, R' is R or $$-CH_2-\underset{\underset{CH_2R''}{|}}{\overset{\overset{CH_2R''}{|}}{C}}-CH_2R'';$$

and at least one R" is Br or Cl and each remaining R" is OH, Br, or Cl. These compounds are useful fire-retardant additives in plastics, textiles, and other normally flammable materials. They are particularly resistant to the production of hydrogen halides at elevated temperatures.

CROSS-REFERENCE TO RELATED APPLICATION

This is a continuation-in-part of our copending application Ser. No. 736,557, filed June 13, 1968, now abandoned.

BACKGROUND OF THE INVENTION

The present invention relates to novel chemical compounds useful as fire-retardant additives for combustible materials.

The use of fire-retardants containing both bromine or chlorine and phosphorus is well known in the art for use with normally flammable materials such as wood, cloth, and polymers such as polyesters and polyurethanes as described, for example, in U.S. Pats. 2,725,311; 2,803,-562; 3,132,169; 3,157,613; and 3,192,242. However, the above and other prior fire-retardants suffer from a number of disadvantages such as their tendency to produce hydrogen halides such as HBr when heated. This hydrogen halide tends to degrade wood fibers and polymers causing an undesirable loss in strength and darkening in color.

SUMMARY OF THE INVENTION

According to the present invention, there are provided novel compounds of Formula I:

(I)
$$\begin{array}{c} R-O \\ \phantom{R-}\diagdown \\ R'-O \end{array} \!\!\! \overset{O}{\underset{}{\parallel}}\!\! P-(O)_n-CH_2-\underset{\underset{CH_2R''}{|}}{\overset{\overset{CH_2R''}{|}}{C}}-CH_2R''$$

wherein $n$ is zero or one; R is lower alkyl, or phenyl having up to three lower alkyl substituents, lower alkyl being defined as of 1–6 carbon atoms; R' is R or $$-CH_2-\underset{\underset{CH_2R''}{|}}{\overset{\overset{CH_2R''}{|}}{C}}-CH_2R'';$$

and at least one R" is Br or Cl and each remaining R" is OH, Br, or Cl. Br is the preferred halogen.

These new compounds have unusual resistance to thermal and hydrolytic decomposition and are therefore superior fire-retardant additives for wood, textiles, plastics, and the like.

DETAILED DESCRIPTION

Most of the compounds of Formula I are conveniently produced by reacting certain phosphorus-containing esters with certain halogenated alcohols. The reaction is accomplished by simply adding the phosphorus-containing ester to the halogenated alcohol which can be dissolved in a suitable solvent such as toluene, followed by heating of the mixture at reaction temperatures generally from 30° to 150° C. for a period of from 1 to 20 hours.

The phosphorus-containing esters suitable for use in the present invention are the mono-, di-, and preferably trihydrocarbyl phosphates and phosphites where hydrocarbyl is phenyl having up to three lower alkyl substituents or lower alkyl where lower alkyl is defined as of 1–6 carbon atoms. Examples of suitable phosphorus-containing esters include, among others, ethyl phosphate, diethyl phosphate, triisopropyl phosphate, trihexyl phosphate, diphenyl ethyl phosphate, triphenyl phosphate, tritolyl phospate, tri-p-sec-butyl phosphate, methyl phosphite, triethyl phosphite, diisobutyl phosphite, triphenyl phosphite, and trixylyl phosphite.

The halogenated alcohols suitable for use in the present invention are those of Formula II:

(II)
$$HOCH_2-\underset{\underset{CH_2R''}{|}}{\overset{\overset{CH_2R''}{|}}{C}}-CH_2R''$$

wherein R" has the meaning previously described in Formula I. Examples of suitable halogenated alcohols of Formula II include, among others:
2,2-bis(bromomethyl)-1,3 propanediol;
3-bromo-2,2-bis(bromomethyl)-1-propanol;
2,2-bis(chloromethyl)-1,3-propanediol;
3-chloro-2,2-bis(chloromethyl)-1-propanol; and
3-chloro-2,2-bis(bromomethyl)-1-propanol.

Somewhat surprisingly, compounds containing different numbers of halogen atoms are obtained depending on whether the phosphorus ester reactant is a phosphate or a phosphite. For example, when a phosphate ester is reacted with a halogenated alcohol of Formula II, instead of the normally expected transesterification reaction of the alcohol, there is obtained predominantly the reaction of a halogen atom in the alcohol molecule and the resulting ester is largely that wherein the radical derived from the starting alcohol contains one less halogen atom while the main byproduct is an organic halide. On the other hand, when the phosphorus ester is a phosphite, the reaction byproduct is largely an alcohol rather than the halide expected from a normal Arbusov reaction and the ester product is for the most part the alkanephosphonate wherein the substituted alkane group contains the same number of halogen atoms as the halogenated alcohol reactant.

Because of the above-described reaction peculiarities, the trihaloneopentyl phosphates are best prepared by another method. A convenient known synthesis whereby such trihalogenated esters are obtained comprises the reaction of the trihalo alcohol of Formula II with a partially esterified phosphorus oxychloride of the formula $(RO)_mPOCl_p$ wherein $m$ is one or two, $p$ is two or one $(m+p=3)$ and R is as defined above. The reaction is usually carried out in a neutral solvent such as diethyl ether at about or slightly above normal room temperature and preferably in the presence of an acid acceptor such as pyridine.

A wide variety of normally flammable materials can be rendered flame-retardant by treating them with the compounds of the present invention. Thus, such normal flammable materials such as wood and polymers such as polyurethanes and polyesters can be treated by applying a solvent solution of these compounds or, in polymer compositions, by incorporating the fire-retardant compound itself in the polymer by conventional means, either as such or in combination with other additives. Alternatively, wherein the compounds of the present invention contain one or more hydroxyl groups, these compounds can be chemically incorporated into a polyester by admixing the polyester with the polyol before reacting it with the polycarboxylic acid to form the polyester. Alternatively, these compounds can be introduced into polyurethanes by employing the hydroxyl group-containing compound as a portion of the polyol to be reacted with the polyisocyanate. As previously stated, these compounds have a high resistance to the production of hydrogen halides such as HBr which can be demonstrated by mixing these compounds with an alkali metal hydroxide such as sodium hydroxide and testing for the presence of alkali metal halides such as sodium bromide.

The present halogenated phosphates and phosphonates have been found to be particularly effective fire-retardant additives for use in polyester resins. Polymers thus advantageously compounded with these additives comprise any of the commonly known polyesters of dicarboxylic acids such as maleic acid, fumaric acid, itaconic acid, tetrahydrophthalic acid, and especially terephthalic acid with aliphatic polyols or ether alcohols such as ethylene glycol, propylene glycol, 1,3-propanediol, 1,4-butanediol, glycerol, pentaerythritol, diethylene glycol, dipropylene glycol, triethylene glycol, or mixtures of any two or more of such polyols. In such polyesters, the halogenated phosphorus esters of this invention are found to provide a substantially higher degree of resistance to burning than structurally similar compounds when used in proportions such that the halogen content of the respective compositions is the same. The present compounds are also convenient to use in that they are ordinarily obtained as viscous liquids or low melting glassy solids which are easily compounded into resinous compositions to obtain uniform products.

The quantity of halogenated phosphate or phosphonate to be used in wood, wood products, cellulosic fibers, or various kinds of polymer resins as described above is not critical since any significant quantity will provide some added resistance to burning. In wood and other cellulosic materials, enough additive may be employed to give a total halogen content of the treated material of from about two to fifty percent or more. In resinous compositions such as polyesters someyhat smaller proportions are ordinarily used to minimize loss of useful properties in the plastic product. In such compositions, the halogenated additives may be used in proportions to provide a halogen content in the finished material of about one to about ten percent, depending upon the end use of the material and the degree of protection desired.

The invention is further illustrated by the following examples in which all parts and percentages are by weight unless otherwise indicated. These non-limiting examples are illustrative of certain embodiments and are designed to teach those skilled in the art how to practice the invention and to represent the best mode contemplated for carrying out the invention. In these examples, IR means "infrared" and NMR means "nuclear magnetic resonance."

EXAMPLE I

This example illustrates the preparation of diethyl (2, 2 - bis(bromomethyl) - 3 - hydroxypropyl)phosphonate.

One hundred fifty-seven grams (0.6 moles) of 2,2-bis (bromomethyl) - 1,3 - propanediol and 100 ml. of toluene were charged to a 500 ml. 3-neck flask equipped with a stirrer, thermometer, addition funnel, and a ¾″ x 10″ Vigreux column equipped with a distillation head. The mixture was heated to 90° C. with stirring and 0.6 moles (100 g.) of triethyl phosphite added slowly over a period of 6 hours. A light fraction was distilled off at 60° to 75° C. The temperature was then raised to 110° to 126° C. for 5 hours and a second light fraction distilled at 75° to 107° C. A total of 89 g. of low boiling material was removed in this way. The balance of the light fraction and the solvent (toluene) was removed by heating the residue in a rotary evaporator to 100° C. at 1 mm. Hg absolute pressure.

Analysis of this lower boiling material showed 0.8 g. moles of $CH_3CH_2OH$ and 0.1 mole of $CH_3CH_2Br$ plus toluene, and traces of unreacted triethyl phosphite. The light yellow, clear product recovered (176 g.) was analyzed and found to contain 44.0% Br and 9.25% P corresponding to diethyl (2,2-bis(bromomethyl)-3-hydroxypropyl)phosphonate of Formula III:

(III) 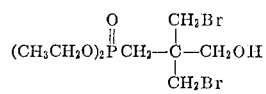

which contains 41.9% Br and 8.1% P. NMR analysis indicated that the product contained about 85% of the compound of Formula III with some of the unreacted 2,2-bis(bromomethyl)-1,3-propanediol. IR analysis supported the phosphonate structure.

EXAMPLE II

This example illustrates the preparation of diethyl (3-bromo - 2,2 - bis(bromomethyl)propyl)phosphonate.

One hundred sixty-two grams (0.5 g. mole) of white 3-bromo-2,2-bis(bromomethyl)-1-propanol and 50 ml. of toluene were charged to a 500 ml. 3-neck flask equipped as in Example I. The flask and its contents were heated to 105° C. and 83 grams (0.5 mole) of triethyl phosphite was added slowly and the low boiling reaction products distilled off as in Example I. The reaction time was 5 hours at 107° to 118° C. plus 6 hours at 120° C. Bromine analysis and the amount of recovered ethyl alcohol indicated that the product was a mixture of about 68% to 78% diethyl (3-bromo-2,2-bis(bromomethyl) propyl)phosphonate of Formula IV:

(IV) 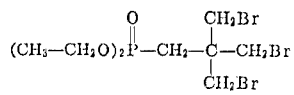

and 20% to 30% of the compound of Formula III. NMR and IR analysis supported the phosphonate structure. IR showed the presence of some alcohol groups.

EXAMPLE III

A quantity of 2,2-bis(bromomethyl)-1,3-propanediol, 131 grams (0.5 g. mole), and 100 ml. of toluene were charged to a 500 ml. 3-neck flask equipped as in Example I. The mixture was heated to 104° C., and 91 grams (0.5 mole) of triethyl phosphate was added slowly with stirring. The reaction time was 3 hours at 104° to 120° C. plus 3 hours at 124° to 127°; 2 hours at 127° to 152°; and 4½ hours at 174° to 177°. Ethyl bromide (0.52 mole) and a small amount of ethyl alcohol and toluene distilled from the reaction. The balance of the solvent was removed at 100° C. and 1.0 mm. Hg absolute pressure in a rotary evaporator.

One hundred thirty-six grams of dark amber, viscous liquid were recovered. Chemical analysis of this material gave 22.6% Br and 10.4% P. This corresponds quite closely to the analysis for 3-bromo-2,2-bis(hydroxymethyl)propyl diethyl phosphate of Formula V:

(V) 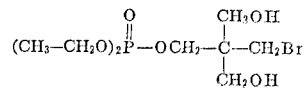

containing 23.9% Br and 9.25% P. NMR analysis confirms the phosphate structure.

EXAMPLE IV

One-half gram-mole, 162 g. of 3-bromo-2,2-bis(bromomethyl)-1-propanol, and 50 ml. of toluene were charged to the flask of Example I. The mixture was heated to 110° C. and 0.5 mole, 91 g., of triethyl phosphate was added slowly with stirring. The mixture was heated to 100° to 168° C. for 4 hours and 168° to 199° C. for an additional 4 hours. Ethyl bromide, a small amount of ethyl alcohol, and most of the toluene were distilled off to leave the product. The product was stripped in a rotary evaporator at 100° C. at 1.0 mm. Hg absolute and 181 g. of a viscous amber liquid recovered. Chemical analysis of this product gave 41.1% Br and 8.2% P. This plus the loss of ethyl bromide indicated that the product was essentially 2,2 - bis(bromomethyl)-3-hydroxypropyl diethyl phosphate of Formula VI;

(VI)
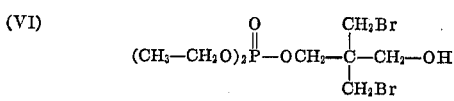

which contains 40.2% Br and 7.8% P. NMR analysis confirmed the phosphate structure.

EXAMPLE V

In the same manner as Example IV, 233 g., 0.72 mole, of $(CH_2Br)_3CCH_2OH$ and 66 g., 0.36 mole, of triethyl phosphate were reacted. A dark amber, very viscous liquid (171 g.) was recovered plus 0.62 mole of ethyl bromide. The main product was bis(2,2-bis(bromomethyl)-3-hydroxypropyl) ethyl phosphate of Formula VII:

(VII)
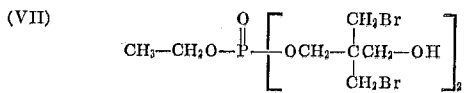

and the conversion to this material based on $CH_3CH_2Br$ recovered was approximately 86%.

EXAMPLE VI

Two grams of zinc chloride were added to a mixture of 266 g. of 3-bromo-2,2-bis(bromomethyl)-1-propanol, 204 g. of crude isopropylphenol, and 200 ml. of toluene in a reaction flask. The crude isopropylphenol was an alkylation reaction product containing about 31% by weight phenol, 43% isopropylphenol (about 1.7/1 ortho/para), 21% diisopropylphenol (largely the 2,4-isomer), and 3% triisopropylphenol. The mixture was heated to 84° C. and 115 g. of $POCl_3$ was added over a period of 4.75 hours, the heat of reaction raising the temperature of the mixture to 128° C. at the end of the addition. An additional two grams of zinc chloride were added and the mixture was stirred at about 130° C. for another fifteen hours.

The reaction mixture was washed with dilute ammonium hydroxide and dried with $CaCl_2$. Toluene was evaporated off under 5 mm. Hg vacuum at 80–90° C. in a rotary evaporator to leave as the residue 460 g. of a light amber, extremely viscous liquid which slowly solidified on standing for several days. IR and elemental analysis together indicated that the product was largely a mixture of about two parts of the bis(isopropylphenyl) 3-bromo-2,2-bis(bromomethyl)propyl phosphate and one part of the isopropylphenyl bis(3-bromo-2,2-bis(bromomethyl)propyl) phosphate wherein mono, di, and triisopropylphenyl groups were present in the proportions and orientations substantially as in the starting crude isopropylphenol. The bis(isopropylphenyl) ester has the formula

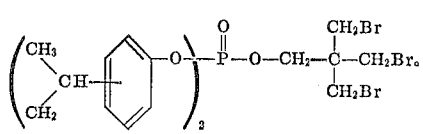

EXAMPLE VII

The general procedure of Example VI was repeated using the same reactants in the same quantities except that the $POCl_3$ was replaced by 103 g. of $PCl_3$. Vacuum evaporation of the toluene solvent left as the reaction product 450 g. of a light colored, very viscous liquid. Some solid material formed on standing for several days. Infrared and elemental analysis showed that the product was a mixture of phosphonate with some unconverted phosphite. The phosphonate was a mixture of about 2.6 parts by weight of bis(isopropylphenyl) 3-bromo-2,2-bis(bromomethyl)propylphosphonate to one part of isopropylphenyl 3 - bromo - 2,2 - bis(bromomethyl)propyl 3-bromo - 2,2 - bis(bromomethyl)propylphosphonate, the isomer distribution in the isopropylphenyl groups being substantially that in the starting isopropylphenol. The principal product, the bis(isopropylphenyl) ester has the formula

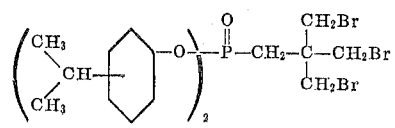

EXAMPLE VIII

Essentially as described in Example VI, a mixture of 266 g. of 3-bromo-2,2-bis(bromomethyl)-1-propanol and 225 g. of crude p-sec-butylphenol was reacted with 115 g. of $POCl_3$ in the presence of zinc chloride. The reaction product remaining after vacuum distillation of the toluene solvent was a light amber, extremely viscous material which was found by analysis as before to be largely bis(sec-butylphenyl) 3-bromo-2,2-bis(bromomethyl)propyl phosphate with a small amount of the corresponding mono-sec-butylphenyl ester. The isomer distribution in the sec-butylphenyl groups corresponded essentially to that of the starting sec-butylphenol which was about 95% mono-sec-butylphenol with minor amounts of phenol and di-sec-butylphenol present. The sec-butylphenol contained about 8 parts of para isomer to one part of meta and 0.5 part of ortho-sec-butylphenol. This isomer distribution was reflected in the phosphate product. The bis(sec-butylphenyl) ester has the formula

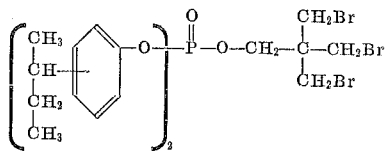

EXAMPLE IX

Using the method of Example VI, a mixture of ethyl alcohol and 3-bromo-2,2-bis(bromomethyl)-1-propanol in about 2:1.1 molar ratio was reacted with $POCl_3$ to make the corresponding mixed phosphate. The product was a light amber viscous liquid which slowly solidified. Elemental analysis indicated that it was a mixture of about three parts diethyl 3-bromo-2,2-bis(bromomethyl)propyl phosphate and one part ethyl bis(3-bromo-2,2-bis(bromomethyl)propyl) phosphate.

EXAMPLE X

By the procedure of Example VI, a 2:1.1 molar mixture of phenol and 3-bromo-2,2-bis(bromomethyl)-1-propanol was reacted with $POCl_3$ to make the mixed phosphate, an off-white solid of relatively low melting point. Elemental analysis showed the product to be a mixture of about 72 percent diphenyl 3-bromo-2,2-bis(bromomethyl)propyl phosphate and 28 percent of the corresponding monophenyl compound.

EXAMPLE XI

Following the procedure of Example VII, a mixture of 188 g. of phenol and 390 g. of 3-bromo-2,2-bis(bromomethyl)-1-propanol was reacted in toluene with 137 g.

of PCl₃ in the presence of zinc chloride. The reaction product after removal of toluene was a cloudy, nearly colorless, viscous material, weight=542 g. The product partially solidified on long standing to a glassy solid. It was analyzed as in the foregoing examples and found to be mostly diphenyl 3-bromo-2,2-bis(bromomethyl)propylphosphonate with some of the corresponding phosphite. The phosphonate has the formula

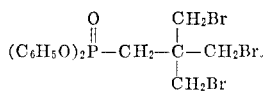

EXAMPLE XII

This example illustrates the flame retardancy of cloth and wood treated with the products of Examples I, II, and IV according to tests adapted from ASTM test 0626-41T (issued 1941) for cloth, and Department of Commerce "Class F" fire test CS42-49 for wood.

A 40% solution in $CH_2Cl_2$ of each of the compounds listed in Column 2 of the following table was prepared for treating materials. 2½" x 10" strips of cotton muslin and viscose rayon were treated by wetting each strip with one of the test solutions. The solution was added from a dropper until the test strip was just wet. The various test strips were then allowed to dry for 48 hours at room temperature, weighed, and the weight gain recorded in Columns 4, 5 and 6 of the table. 2½" x 10" wood strips were cut from cedar shakes, painted with the solution, and allowed to dry for 48 hours. The cloth strips were hung vertically inside a shield. A Bunsen burner with a 1½" luminous flame was placed under the lower end of the strip so that the bottom end was ¾" into the flame. The cloth was exposed to the flame for 12 seconds and then removed. The time the sample continued to flame and the duration of the afterglow were measured with a stop-watch and recorded respectively in Columns 7 and 8. The tear length was determined by gently lifting a spatula through the charred area until it stopped measuring the length of the tear and recording it in Column 9.

The wood strips were supported at a 45° angle with a split side toward the flame. The 1½" luminous flame from a Bunsen burner mounted 1" below and 3" up from the bottom center was allowed to burn for 12 seconds. The time the flame continued to burn (or the time required for the flame to spread to both edges) and the time of the afterglow are recorded. The length and width of the charred area were measured and recorded.

were mixed at 250°-265° C. using a Brabender mixer. The mixture was then ground to a powder and test samples were fabricated by molding the powder on a glass cloth support at 290-300° C. and 1-7 tons per square inch pressure. Test strips 4 x ¼ x ⅛ inch in size were cut from the molded samples and were burned in a limiting oxygen index test (L.O.I.) (ASTM method D2863-70) as described in Combustion and Flame, 10, 135 (1966). Briefly, this test consists of suspending a sample strip in an upright glass tube of about three inches diameter with air and nitrogen inlets at the bottom to provide a mixture of known oxygen content, igniting the sample, and determining the oxygen concentration at which the sample does not continue to burn. The index is the ratio $$n = \frac{O_2}{O_2 + N_2}.$$

With air alone, for example, the index is 0.21. A sample having an index above 0.25 is usually considered acceptably fire retardant.

The results of these tests comparing samples of polyester with no fire-retardant additive, polyester containing a commercial brominated phosphate fire-retardant additive, and polyester containing equivalent amounts of typical products of this invention are listed in Table II. The result in each case is an average of the data from three test strips of each composition.

TABLE II

| Additive | Percent Br in polyester | L.O.I. |
|---|---|---|
| None | 0 | 0.205 |
| Tris(2,3-dibromopropyl)phosphate | 5 | 0.262 |
| Product of example: | | |
| II [1] | 5 | 0.278 |
| VI | 5 | 0.308 |
| VII | 5 | 0.31 |
| VIII | 5 | 0.308 |
| IX | 5 | 0.309 |
| X | 5 | 0.309 |

[1] A mixture of about 75% diethyl 3-bromo-2,2-bis(bromomethyl)-propylphosphate and 25% diethyl 2,2-bis(bromomethyl)-3-hydroxypropylphosphonate.

EXAMPLE XIV

This example illustrates the resistance to release of hydrogen halides by the compounds of the present inven-

TABLE

| 1 | 2 | 3 | Weight gain | | | 7 | 8 | 9 | 10 |
|---|---|---|---|---|---|---|---|---|---|
| | | | 4 | 5 | 6 | | After | | |
| Run No. | Compound (formula number) | Material treated (name) | Total (percent) | Br (percent) | P (percent) | Flame time (sec.) | glow time (sec.) | Tear length (in.) | Char area (in. x in.) |
| 1 | None | Muslin | | | | (²) | 31 | (³) | (³) |
| 2 | do | Commercial viscose rayon | | | | 16 | 10 | (³) | (³) |
| 3 | do | F.R. rayon ¹ | | | | 0 | 0 | 4¼ | |
| 4 | do | Wood | | | | (⁴) | (⁵) | | (⁶) |
| 5 | IV | Muslin | 164 | 89 | 11 | 0 | 0 | 2⅛ | |
| 6 | IV | do | 89 | 48 | 6.2 | 0 | 0 | 2⁹⁄₁₆ | |
| 7 | IV | Rayon | 49 | 26 | 3.4 | 0 | 0 | 2 | |
| 8 | IV | Wood | 8.5 | 4.6 | 0.6 | 0 | 0 | | 1 x 1½ |
| 9 | III | Muslin | 166 | 70 | 13 | 0 | 0 | 2⅛ | |
| 10 | III | do | 95 | 40 | 7.6 | 0 | 0 | 2⅝ | |
| 11 | III | Rayon | 65 | 27 | 5.2 | 0 | 0 | 2¼ | |
| 12 | III | Wood | 8.5 | 3.6 | 0.68 | 0 | 0 | | ⅞ x 1½ |
| 13 | VI | Muslin | 55 | 22 | 4.4 | 0 | 0 | 3 | |
| 14 | VI | do | 97 | 39 | 7.8 | 0 | 0 | 2¾ | |
| 15 | VI | Rayon | 44 | 18 | 3.5 | 0 | 0 | 1⅞ | |
| 16 | VI | Wood | 7.2 | 2.9 | 0.58 | 0 | 0 | | ⅞ x 1¹⁄₁₆ |

¹ Fire retardant rayon containing tris(2,3-dibromopropyl) phosphate, quantity not known.
² Consumed in initial 12 seconds.
³ All burned.
⁴ 60 seconds to spread.
⁵ Sample continued to burn and had to be extinguished.
⁶ 2½ x 5 on one side, 3¼ on the other.

EXAMPLE XIII

Molten polyethylene terephthalate and the desired amount of brominated phosphorus compound to give a composition having the percentage of bromine indicated tion. The products of Examples 1-5 were subjected to the following test:

A quantity of five grams of the subject compound was mixed with 100 ml. of water and 175 ml. of 0.1N NaOH The mixture was stirred for 15 minutes at room temperature, then it was acidified by addition of 5 ml. dilute nitric acid. The acidified mixture was titrated with 0.1N AgNO₃ for halide or free halogen using standard Volhard indicator. No titratable halogen was found with any of the compounds. Similar results are obtained when the same test procedure is applied to the products of Examples 6-10 and to the other compounds of the invention as previously defined.

By procedures such as shown in Examples I-X, phosphates and phosphonates of the defined structures containing chlorine or a mixture of chlorine and bromine are prepared by reacting a suitable phosphate or phosphite with a halogenated alcohol of Formula II where the halogen is chlorine or a mixture of chlorine and bromine. Some of the compounds, particularly the phenyl or alkylphenyl phosphates and phosphonates, are more conveniently prepared by reacting mixtures in the desired proportions of alcohols or alcohol plus the phenol with POCl₃ or PCl₃ as previously explained and as shown in Examples VI to X. For example, by these methods there are obtained compounds such as diethyl 3-chloro-2,2-bis(choromethyl)propylphosphonate,
3-chloro-2,2-bis(hydroxymethyl)propyl diethyl phosphate,
p-tert-amylphenyl bis(3-bromo-2,2-bis(chloromethyl) propyl)phosphate, and
3-bromo-2-(chloromethyl)-2-(hydroxymethyl) propyl diethyl phosphate.

These compounds have similar although somewhat reduced fire-retardant properties as compared to the corresponding brominated compounds.

Other compounds of the invention include diisopropyl 3-bromo-2,2-bis(bromomethyl)propylphosphonate,
dimesityl 3-hydroxy-2,2-bis(bromomethyl)propyl phosphate,
hexyl bis(3-bromo-2,2-bis(bromomethyl)propyl) phosphate,
p-tert-butylphenyl 3-bromo-2,2-bis(bromomethyl)propyl 3-bromo-2,2-bis(bromomethyl)propylphosphonate, and isomers and analogs of these as defined by the general formula.

Although the invention has been described in considerable detail with reference to certain preferred embodiments thereof, it will be understood that variations and modifications can be effected within the spirit and scope of the invention as described above and as defined in the appended claims.

We claim:
1. A compound of the formula

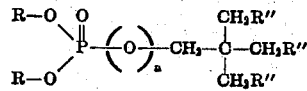

wherein n is zero or one; R is lower alkyl; R' is R or

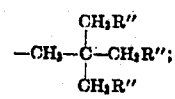

at least one R" is Br and each remaining R" is OH or Br, at least one R" being OH when n is one.

2. The compound of Claim 1 wherein R' is a lower alkyl radical.

3. The compound of Claim 2 of the formula:

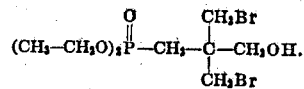

4. The compound of Claim 2 of the formula:

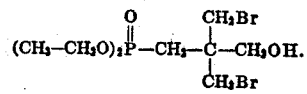

5. The compound of Claim 2 of the formula:

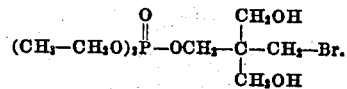

6. The compound of Claim 2 of the formula:

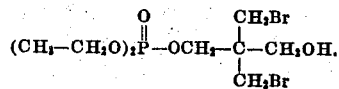

7. The compound of Claim 1 of the formula:

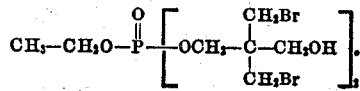

8. The compound of Claim 2 wherein n is zero.
9. The compound of Claim 2 wherein n is one.

References Cited
UNITED STATES PATENTS 3,324,205  6/1967  Carpenter et al. ____ 260—956 X
3,287,266  11/1966  Southern et al. ____ 260—965 X
3,456,041  7/1969  Burk et al. _____ 260—967

ANTON H. SUTTO, Primary Examiner

U.S. Cl. X.R.

106—15 FP; 117—136; 260—2.5 AJ, 45.7 P, 961, 963, 965